United States Patent
Tang

(10) Patent No.: US 11,350,414 B2
(45) Date of Patent: May 31, 2022

(54) METHOD FOR TRANSMITTING UPLINK SIGNAL, TERMINAL DEVICE AND NETWORK SIDE DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/344,208

(22) PCT Filed: Nov. 3, 2016

(86) PCT No.: PCT/CN2016/104476
§ 371 (c)(1),
(2) Date: Apr. 23, 2019

(87) PCT Pub. No.: WO2018/081991
PCT Pub. Date: May 11, 2018

(65) Prior Publication Data
US 2019/0261340 A1    Aug. 22, 2019

(51) Int. Cl.
*H04W 72/04*    (2009.01)
*H04B 7/06*    (2006.01)
(Continued)

(52) U.S. Cl.
CPC ........ *H04W 72/046* (2013.01); *H04B 7/0695* (2013.01); *H04L 1/1614* (2013.01);
(Continued)

(58) Field of Classification Search
CPC . H04W 72/046; H04W 16/02; H04W 74/004; H04W 74/0833; H04W 16/28;
(Continued)

(56) References Cited

U.S. PATENT DOCUMENTS 7,817,088 B2    10/2010    Lou
9,591,645 B2*    3/2017    Seol .................... H04B 7/0695
(Continued)

FOREIGN PATENT DOCUMENTS

CN    103907369 A    7/2014
CN    105812035 A    7/2016
(Continued)

OTHER PUBLICATIONS

International Search Report in international application No. PCT/CN2016/104476, dated Apr. 6, 2017.
(Continued)

*Primary Examiner* — Harry H Kim

(57) ABSTRACT

Provided are a method for transmitting an uplink signal, a terminal device and a network side device. The method comprises: a terminal device receives first information sent by a network side device, the first information being used for the terminal device to determine a beam or beam group used for sending an uplink signal to the network side device; according to the first information, the terminal device determines a target beam or target beam group for sending the uplink signal; the terminal device uses the target beam or target beam group to send the uplink signal to the network side device. The present invention improves the uplink signal reception performance of the network side device.

6 Claims, 4 Drawing Sheets

(51) Int. Cl.

| | |
|---|---|
| *H04L 1/16* | (2006.01) |
| *H04L 1/18* | (2006.01) |
| *H04L 5/00* | (2006.01) |
| *H04L 25/02* | (2006.01) |
| *H04W 16/02* | (2009.01) |
| *H04W 74/00* | (2009.01) |
| *H04W 74/08* | (2009.01) |
| *H04B 7/0404* | (2017.01) |
| *H04W 16/28* | (2009.01) |

(52) U.S. Cl.
CPC .......... *H04L 1/1819* (2013.01); *H04L 5/0051* (2013.01); *H04L 25/0226* (2013.01); *H04W 16/02* (2013.01); *H04W 74/004* (2013.01); *H04W 74/0833* (2013.01); *H04B 7/0404* (2013.01); *H04L 25/0224* (2013.01)

(58) Field of Classification Search
CPC ............ H04W 72/0413; H04W 72/042; H04B 7/0695; H04B 7/0404; H04L 1/1614; H04L 1/1819; H04L 5/0051; H04L 25/0226; H04L 25/0224; H04L 5/0023; H04L 5/0048

See application file for complete search history.

(56) References Cited

U.S. PATENT DOCUMENTS

| | | | |
|---|---|---|---|
| 10,411,839 B2* | 9/2019 | Guo | H04B 7/0695 |
| 10,681,742 B2* | 6/2020 | Tsai | H04W 74/0833 |
| 2010/0002649 A1 | 1/2010 | Teo et al. | |
| 2013/0182683 A1 | 7/2013 | Seol et al. | |
| 2015/0049824 A1 | 2/2015 | Kim et al. | |
| 2016/0013847 A1 | 1/2016 | Kim et al. | |
| 2016/0174056 A1* | 6/2016 | Nagata | H04W 48/16 370/329 |
| 2016/0294463 A1 | 10/2016 | He | |
| 2016/0352403 A1* | 12/2016 | Kishiyama | H04B 7/0695 |
| 2017/0099120 A1* | 4/2017 | Damnjanovic | H04B 7/18541 |
| 2018/0042000 A1* | 2/2018 | Zhang | H04B 7/088 |
| 2019/0021085 A1* | 1/2019 | Mochizuki | H04W 48/16 |
| 2019/0081751 A1* | 3/2019 | Miao | H04L 25/0224 |
| 2019/0158164 A1 | 5/2019 | Kishiyama et al. | |
| 2019/0166610 A1* | 5/2019 | Lee | H04W 72/1268 |
| 2019/0245592 A1* | 8/2019 | Chae | H04B 7/0404 |
| 2020/0044721 A1* | 2/2020 | Choi | H04L 5/0023 |

FOREIGN PATENT DOCUMENTS

| | | |
|---|---|---|
| CN | 105940699 A | 9/2016 |
| CN | 105812035 B | 3/2020 |
| EP | 3280068 A1 | 2/2018 |
| JP | 2015165640 A | 9/2015 |
| RU | 2192094 C1 | 10/2002 |
| WO | 2007034124 A2 | 3/2007 |
| WO | 2013109059 A1 | 7/2013 |
| WO | 2015119076 A1 | 8/2015 |
| WO | 2016165128 A1 | 10/2016 |

OTHER PUBLICATIONS

Written Opinion of the International Search Authority in international application No. PCT/CN2016/104476, dated Apr. 6, 2017.
Extended European Search Report dated Jul. 22, 2019; Appln. No. 16920827.9.
English translation Written Opinion dated Apr. 6, 2017; PCT/CN2016/104476.
First Office Action of the Russian application No. 2019116516, dated Dec. 5, 2019.
First Office Action of the Chilean application No. 201901196, dated Mar. 3, 2020.
Notice of Allowance of the Russian application No. 2019116516, dated Apr. 1, 2020.
First Office Action of the Chinese application No. 201680090279.4, dated Apr. 17, 2020.
First Office Action of the Canadian application No. 3041740, dated Apr. 23, 2020.
Written Opinion of the Singaporean application No. 11201903783S, dated May 16, 2020.
First Office Action of the Japanese application No. 2019-522476, dated Nov. 20, 2020.
First Office Action of the Israeli application No. 266280, dated Dec. 13, 2020.
First Office Action of the Taiwanese application No. 106137656, dated Jan. 14, 2021.
Second Office Action of the Canadian application No. 3041740, dated Feb. 16, 2021.
Second Office Action of the Singaporean application No. 11201903783S, dated Mar. 1, 2021.
Second Office Action of the European application No. 16920827.9, dated Feb. 4, 2021.
First Office Action of the Indonesian application No. P00201904580, dated Apr. 20, 2021.
Huawei, HiSilicon,"Discussion on beam management aspects for UL MIMO", 3GPP TSG RAN WG1 Meeting #86bis R1-1609415, Lisbon, Portugal, Oct. 10-14, 2016.
Samsung, Huawei, HiSilicon, "WF on UL Beam Management", 3GPP TSG RAN WG1 Meeting #86bis, R1-1610984 Lisbon, Portugal, Oct. 10-14, 2016, Agenda item: 8.1.4.1.
Second Office Action of the Chinese application No. 201680090279.4, dated Aug. 5, 2020.
Second Office Action of the Chilean application No. 201901196, dated Jul. 30, 2020.
First Office Action of the European application No. 16920827.9, dated Jun. 29, 2020.
First Office Action of the Indian application No. 201917019569, dated Oct. 21, 2020.
First Office Action of the Brazilian application No. BR1120190084037, dated Sep. 1, 2020.
Office Action of the Australian application No. 2016428424, dated Aug. 18, 2021.
Second Office Action of the Japanese application No. 2019-522476, dated Aug. 20, 2021.
Third Office Action of the Japanese application No. 2019-522476, dated Dec. 3, 2021.
First Office Action of the Vietnamese application No. 1-2019-02477, dated Feb. 25, 2022.

* cited by examiner

METHOD FOR TRANSMITTING UPLINK SIGNAL, TERMINAL DEVICE AND NETWORK SIDE DEVICE

TECHNICAL FIELD

The disclosure relates to the field of communication, and in particular to a method for uplink signal transmission, a terminal device and a network device.

BACKGROUND

When a terminal device transmits an uplink signal to a network device, a beamforming technology may be adopted to improve the transmission performance of the uplink signal. However, when the terminal device transmits the uplink signal to the network device by using a beam or a beam group, there is a possibility that the terminal device does not know which beam or beam group is directed to the network side. Therefore, there is a need to propose a method for transmitting the uplink signal, in which the terminal device can determine a beam or a beam group for transmitting the uplink signal to the network device, and thus the network device can accurately receive the uplink signal transmitted by the terminal device.

SUMMARY

The embodiments of the disclosure provide a method for uplink signal transmission, a terminal device and a network device to improve the performance of the network device in terms of receiving uplink signal(s).

A first aspect provides a method for uplink signal transmission, which may include: a terminal device receives first information transmitted by a network device, where the first information is used for the terminal device to determine a beam or a beam group for transmitting one or more uplink signals to the network device; the terminal device determines, according to the first information, a target beam or a target beam group for transmitting the uplink signals; and the terminal device transmits the uplink signals to the network device by using the target beam or the target beam group.

It should be understood that the first information here may be a beam or a beam group for directly instructing the terminal device to transmit the uplink signals to the network device, or may be a beam or a beam group for indirectly instructing the terminal device to transmit the uplink signals to the network device.

The network device may notify, via the first information, the terminal device of the beam or the beam group for transmitting the uplink signals at present, so that the terminal can transmit the uplink signals to the network side on the target beam or the target beam group determined according to the first information, and thus the performance of the network device in terms of receiving the uplink signals is improved.

In combination with the first aspect, in some implementation manners of the first aspect, the first information is configured to indicate a target sounding signal or a target sounding signal group in multiple sounding signals transmitted to the network device by the terminal device.

In combination with the first aspect, in some implementation manners of the first aspect, the action that the terminal device determines, according to the first information, a target beam or a target beam group for transmitting the uplink signals may include that, the terminal device determines a beam or a beam group corresponding to the target sounding signal or the target sounding signal group, to be the target beam or the target beam group for transmitting the uplink signals.

In combination with the first aspect, in some implementation manners of the first aspect, before the terminal device receives the first information transmitted by the network device, the method may further include that, the terminal device transmits the multiple sounding signals to the network device by using different beams or beam groups.

In combination with the first aspect, in some implementation manners of the first aspect, the target sounding signal is at least one sounding signal in a predefined sounding signal group; and the first information is specifically configured to indicate an index of the target sounding signal in the predefined sounding signal group.

In combination with the first aspect, in some implementation manners of the first aspect, the first information is bitmap information, and the bitmap information is configured to indicate that the target sounding signal is the at least one sounding signal in the predefined sounding signal group.

In combination with the first aspect, in some implementation manners of the first aspect, the first information is specifically configured to indicate an index of the target sounding signal group in predefined multiple sounding signal groups.

In some implementation manners of the first aspect, the terminal device determines the sounding signal or the sounding signal group according to a resource used by the first information as well as a mapping relationship between the resource used by the first information and the target sounding signal or the target sounding signal group.

In combination with the first aspect, in some implementation manners of the first aspect, the first information is configured to indicate a beam or a beam group used by the terminal device to transmit the uplink signals to the network device.

In combination with the first aspect, in some implementation manners of the first aspect, the target beam is at least one beam in a predefined beam group; and the first information is specifically configured to indicate an index of the target beam in a predefined beam group.

In combination with the first aspect, in some implementation manners of the first aspect, the first information is bitmap information, and the bitmap information is configured to indicate that the target beam is at least one beam in the predefined beam group.

In combination with the first aspect, in some implementation manners of the first aspect, the first information is specifically configured to indicate an index of the target beam group in predefined multiple beam groups.

In some implementation manners of the first aspect, the terminal device determines the target beam or the target beam group according to a resource used by the first information as well as a mapping relationship between the resource used by the first information and the target beam or the target beam group.

In combination with the first aspect, in some implementation manners of the first aspect, that the terminal device transmits the uplink signals to the network device by using the target beam or the target beam group may include: the terminal device performs beamforming on the uplink signals based on a beamforming weight corresponding to the target beam or the target beam group to obtain the beamformed uplink signals; and the terminal device transmits the beamformed uplink signals to the network device.

In combination with the first aspect, in some implementation manners of the first aspect, the action that the terminal device transmits the uplink signals to the network device by using the target beam or the target beam group may include that, the terminal device transmits the uplink signals to the network device by using at least one beam in the target beam group.

In combination with the first aspect, in some implementation manners of the first aspect, the action that the terminal device transmits the uplink signals to the network device by using the target beam or the target beam group may include that, the terminal device transmits the uplink signals by using the target beam or different beams in the target beam group, where uplink signals transmitted on the different beams are transmitted on different time frequency resources.

In combination with the first aspect, in some implementation manners of the first aspect, the uplink signals transmitted on the different beams are transmitted on a same time domain transmission unit and different frequency domain transmission units; or, the uplink signals transmitted on the different beams are transmitted on a same frequency domain transmission unit and different time domain transmission units.

In combination with the first aspect, in some implementation manners of the first aspect, the uplink signals include any one of uplink data, an uplink control signal, an uplink pilot signal and an uplink random access signal.

In combination with the first aspect, in some implementation manners of the first aspect, the uplink signals include the uplink data; a first beam in the target beam group is used for first-time transmission of the uplink data; and other beams in the target beam group are used for possible Hybrid Automatic Repeat Request (HARQ) retransmission of the uplink data.

In combination with the first aspect, in some implementation manners of the first aspect, the uplink signals include the uplink data; and the first beam in the target beam group is used for the first-time transmission and the possible HARQ retransmission of the uplink data.

In combination with the first aspect, in some implementation manners of the first aspect, the uplink signals include the uplink data; the target beam is at least one beam in the predefined beam group; the target beam is used for the first-time transmission of the uplink data; and beams in the predefined beam group other than the target beam are used for the possible HARQ retransmission of the uplink data.

In combination with the first aspect, in some implementation manners of the first aspect, the action that the terminal device transmits the uplink signals to the network device by using the target beam or the target beam group may include that, the terminal device transmits the uplink signals by using the target beam or different beams in the target beam group, where service types of the uplink signals transmitted on the different beams are different.

In combination with the first aspect, in some implementation manners of the first aspect, the action that the terminal device transmits the uplink signals to the network device by using the target beam or the target beam group may include that, the terminal device transmits the uplink signals by using the target beam or different beams in the target beam group, where sub-carrier spacings used by uplink signals transmitted on the different beams are different.

In combination with the first aspect, in some implementation manners of the first aspect, the first information is carried in Downlink Control Information (DCI) transmitted to the terminal device by the network device.

A second aspect provides a method for uplink signal transmission, which may include that, a terminal device determines first information, where the first information is used for the terminal device to determine a beam or a beam group for transmitting one or more uplink signals to the network device; the network device transmits the first information to the terminal device; and the network device receives the uplink signals transmitted by the terminal device by using a target beam or a target beam group, where the target beam or the target beam group is determined by the terminal device according to the first information.

The network device may notify, via the first information, the terminal device of the beam or the beam group for transmitting the uplink signals at present, so that the terminal can transmit the uplink signals to the network side on the target beam or the target beam group determined according to the first information, and thus the performance of the network device in terms of receiving the uplink signals is improved.

In combination with the second aspect, in some implementation manners of the second aspect, the first information is configured to indicate a target sounding signal or a target sounding signal group in multiple sounding signals transmitted to the network device by the terminal device.

In combination with the second aspect, in some implementation manners of the second aspect, before the network device transmits the first information to the terminal device, the method may further include, the network device receives the multiple sounding signals transmitted to the network device by the terminal device by using different beams or beam groups.

In combination with the second aspect, in some implementation manners of the second aspect, the target sounding signal is at least one sounding signal in a predefined sounding signal group; and the first information is specifically configured to indicate an index of the target sounding signal in the predefined sounding signal group.

In combination with the second aspect, in some implementation manners of the second aspect, the first information is bitmap information, and the bitmap information is configured to indicate that the target sounding signal is at least one sounding signal in the predefined sounding signal group.

In combination with the second aspect, in some implementation manners of the second aspect, the first information is specifically configured to indicate an index of the target sounding signal group in predefined multiple sounding signal groups.

In combination with the second aspect, in some implementation manners of the second aspect, the first information is configured to indicate a beam or a beam group used by the terminal device to transmit the uplink signals to the network device.

In combination with the second aspect, in some implementation manners of the second aspect, the target beam is at least one beam in a predefined beam group; and the first information is specifically configured to indicate an index of the target beam in the predefined beam group.

In combination with the second aspect, in some implementation manners of the second aspect, the first information is bitmap information, and the bitmap information is configured to indicate that the target beam is at least one beam in the predefined beam group.

In combination with the second aspect, in some implementation manners of the second aspect, the first information is specifically configured to indicate an index of the target beam group in predefined multiple beam groups.

In combination with the second aspect, in some implementation manners of the second aspect, the uplink signals include any one of uplink data, an uplink control signal, an uplink pilot signal, and an uplink random access signal.

In combination with the second aspect, in some implementation manners of the second aspect, the uplink signals include the uplink data; a first beam in the target beam group is used for first-time transmission of the uplink data; and other beams in the target beam group are used for possible HARQ retransmission of the uplink data.

In combination with the second aspect, in some implementation manners of the second aspect, the uplink signals include the uplink data; and the first beam in the target beam group is used for the first-time transmission and the possible HARQ retransmission of the uplink data.

In combination with the second aspect, in some implementation manners of the second aspect, the uplink signals include the uplink data; the target beam is the at least one beam in the predefined beam group; the target beam is used for the first-time transmission of the uplink data; and beams in the predefined beam group other than the target beam are used for the possible HARQ retransmission of the uplink data.

In combination with the second aspect, in some implementation manners of the second aspect, the first information is carried in DCI transmitted to the terminal device by the network device.

A third aspect provides a terminal device, which may include a module configured to execute the method in the first aspect.

A fourth aspect provides a network device, which may include a module configured to execute the method in the second aspect.

A fifth aspect provides a terminal device, which may include a memory, a transceiver and a processor. The memory is configured to store a program; the processor is configured to execute the program; and when the program is executed, the processor and the transceiver execute the method in the first aspect.

A sixth aspect provides a network device, which may include a memory, a transceiver and a processor. The memory is configured to store a program; the processor is configured to execute the program; and when the program is executed, the processor and the transceiver execute the method in the second aspect.

A seventh aspect provides a computer readable medium. The computer readable medium stores program codes executed by a device; and the program codes include instructions for executing the method in the first aspect.

An eighth aspect provides a computer readable medium. The computer readable medium stores program codes executed by a device; and the program codes include instructions for executing the method in the second aspect.

A ninth aspect provides a system chip, which may include an input interface, an output interface, a processor and a memory. The processor is configured to execute codes in the memory; and when the codes are executed, the processor may implement each process executed by a terminal device in the first aspect.

A tenth aspect provides a system chip, which may include an input interface, an output interface, a processor and a memory. The processor is configured to execute codes in the memory; and when the codes are executed, the processor may implement each process executed by a terminal device in the second aspect.

DETAILED DESCRIPTION

A method for uplink signal transmission, a terminal device and a network device in the embodiments of the disclosure will be described below in detail in combination with accompanying drawings.

Figure 1:
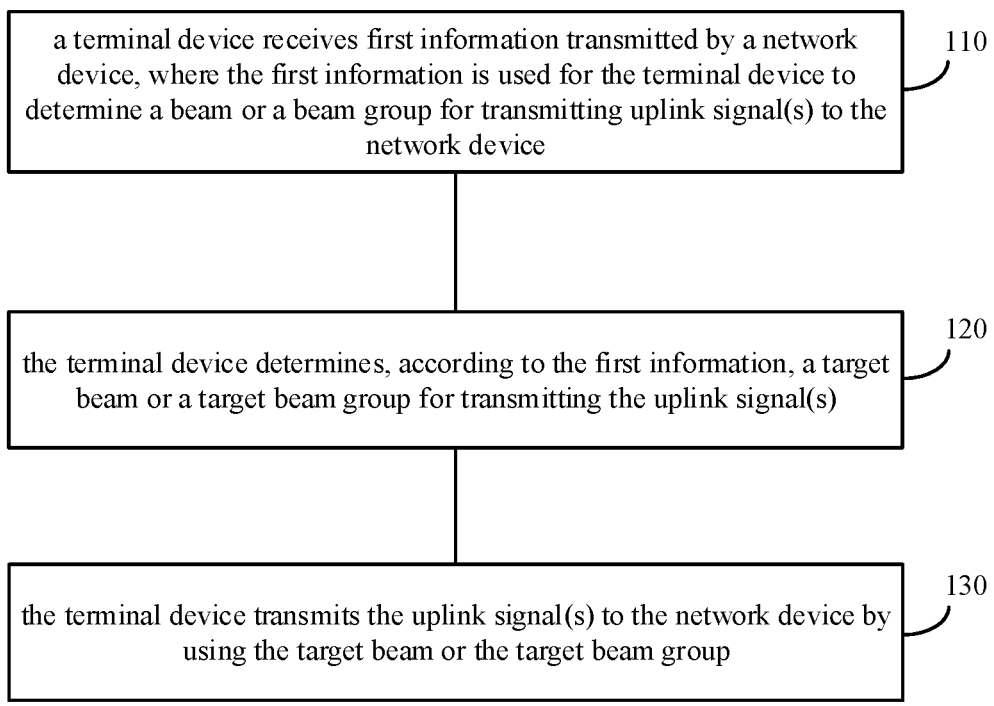
FIG. 1 illustrates a schematic flowchart of a method for uplink signal transmission according to an embodiment of the disclosure.

FIG. 1 illustrates a schematic flowchart of a method for uplink signal transmission according to an embodiment of the disclosure. The method in FIG. 1 may include the following actions.

At 110, a terminal device receives first information transmitted by a network device, where the first information is used for the terminal device to determine a beam or a beam group used for transmitting one or more uplink signals to the network device.

The beam may be at least one beam in a predefined beam group, and the beam group may be a beam group in predefined multiple beam groups.

The uplink signals may include any one of uplink data, an uplink control signal, an uplink pilot signal and an uplink random access signal. The uplink control signal may be Acknowledgement (ACK)/Negative Acknowledgement (NACK) information, Channel State Information (CSI) and the like.

At 120, the terminal device determines, according to the first information, a target beam or a target beam group for transmitting the uplink signal(s).

The target beam group may be one or more beams in a predefined beam group (there may be one target beam or multiple target beams), and the target beam group may be a beam group in predefined several beam groups.

At 130, the terminal device transmits the uplink signal(s) to the network device by using the target beam or the target beam group.

According to the method for uplink signal transmission provided by this embodiment of the disclosure, the network device may notify, via the first information, the terminal device of the beam or the beam group for transmitting the uplink signal(s) at present, so that the terminal can transmit the uplink signal(s) to the network side on the target beam or the target beam group determined according to the first information, and thus the performance of the network device in terms of receiving the uplink signal(s) is improved.

In some embodiments, the first information is configured to indicate a target sounding signal or a target sounding signal group in one or more sounding signals transmitted to the network device by the terminal device. Herein, the first information is indication information configured to indicate the target sounding signal or the target sounding signal group. The terminal device can determine, upon the reception of the first information, the target sounding signal or the target sounding signal group according to the first information. Thereafter, the terminal device determines the target beam or the target beam group according to the target sounding signal or the target sounding signal group. In other words, the terminal device cannot directly determine the target beam or the target beam group according to the first information, but determines the target sounding signal or the target sounding signal group via the first information, and then indirectly determines the target beam or the target beam group according to the target sounding signal or the target sounding signal group.

The target sounding signal may be a sounding signal of which the quality is relatively good in multiple sounding signals transmitted to the network device by the terminal device, and the target sounding signal group may be a sounding signal group composed of multiple sounding signals of which the quality is relatively good in the multiple sounding signals transmitted to the network device by the terminal device.

In some embodiment, the first information is configured to indicate a beam or a beam group used by the terminal device to transmit the uplink signal(s) to the network device. Herein, the first information is indication information directly indicating the beam or the beam group. The terminal device may directly determine, upon the reception of the first information, the target beam or the target beam group according to indication of the first information.

Figure 3:
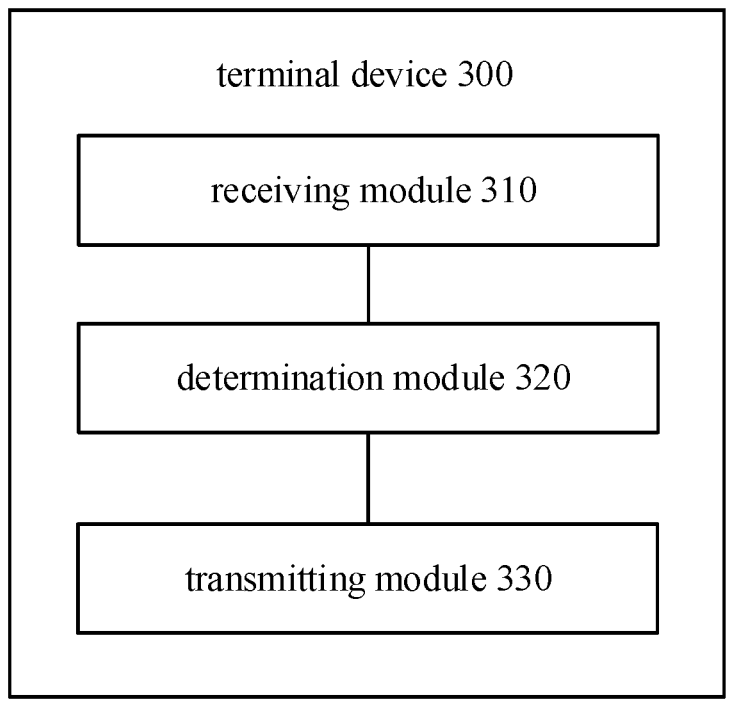
FIG. 3 illustrates a schematic structural diagram of a terminal device according to an embodiment of the disclosure.

In some embodiments, before the terminal device receives the first information transmitted by the network device, the method in FIG. 3 may further include that, the terminal device transmits the multiple sounding signals to the network device by using different beams or beam groups.

In some embodiments, the action that the terminal device determines, according to the first information, a target beam or a target beam group for transmitting the uplink signal(s) may include that, the terminal device determines a beam or a beam group corresponding to the target sounding signal or the target sounding signal group, to be the target beam or the target beam group for transmitting the uplink signal(s).

The beam corresponding to the target sounding signal may be a beam used by the terminal device to transmit the target sounding signal to the network device, and the beam group corresponding to the target sounding signal group may be a beam group used by the terminal device to transmit the target sounding signal group to the network device.

For example, the terminal device transmits four Sounding Reference Signals (SRSs) to the network device by using four different beams respectively, and the network device may feed an SRS of which the receiving quality is the best back to the network device via the first information. In this way, the network device may know a beam having a best transmission performance at present and uses the beam for the transmission of the uplink signal(s).

In some embodiments, when the first information is a signal configured to indicate the target sounding signal or the target sounding signal group in the sounding signals transmitted to the network device by the terminal device, regarding the first information that indicates the target sounding signal or the target sounding signal group, the following three cases may specifically be included.

(1) The target sounding signal is at least one sounding signal in a predefined sounding signal group; and the first information is specifically configured to indicate an index of the target sounding signal in the predefined sounding signal group.

For example, when the target sounding signal is a first sounding signal in a predefined first sounding signal group, the first information is specifically configured to indicate that an index number of the target sounding signal in the first sounding signal group is 1; and when the target sounding signals are first and second sounding signals in the first sounding signal group, the first information is specifically configured to indicate that the indexes of the target sounding signals in the first sounding signal group are 1 and 2.

(2) The first information is specifically configured to indicate an index of the target sounding signal group in predefined multiple sounding signal groups.

For example, the target sounding signal group is a second sounding signal group in predefined five sounding signal groups, the first information is specifically configured to indicate that an index of the target sounding signal group in the predefined five sounding signal groups is 2.

(3) The first information is bitmap information, and the bitmap information is configured to indicate that the target sounding signal is at least one sounding signal in the predefined sounding signal group.

For example, the predefined first sounding signal group includes five sounding signals in total, where the target sounding signals are second and third sounding signals in the first sounding signal group; and the bitmap information includes five bits in total, where the second and third bits are 1 and other bits are 0.

In the above cases (1)-(3), the configuration (e.g., information such as a physical resource, a sequence and the like for transmission) of the predefined sounding signal group or the predefined multiple sounding signal groups may be notified to the terminal device by the network device via high-level signaling, or may be agreed in advance by the network device and the terminal device.

In some embodiments, when the first information is information directly configured to indicate the beam or the beam group used by the terminal device to transmit the uplink signal to the network device, regarding the first indication information that indicates the target beam or the target beam group, the following three cases may specifically be included.

(4) The target beam is at least one beam in a predefined beam group, and the first information is specifically configured to indicate an index of the target beam in the predefined beam group.

For example, when the target beam is a third beam in a predefined first beam group, the first information is specifically configured to indicate that an index of the target beam in the first beam group is 3; and when the target beams are third and fourth beams in the first beam group, the first information is specifically configured to indicate that the indexes of the target beams in the first beam group are 3 and 4.

(5) The first information is specifically configured to indicate an index of the target beam group in predefined multiple beam groups.

For example, the target beam group is a third beam group in predefined five beam groups, the first information is specifically configured to indicate that an index of the target beam group in the predefined five beam groups is 3.

(6) The first information is bitmap information, and the bitmap information is configured to indicate that the target beam is at least one beam in the predefined beam group.

For example, the predefined first beam group includes five beams in total, where the target beams are second and third beams in the first beam group; and the bitmap information includes five bits in total, where second and third bits are 1 and other bit are 0, or the second and third bits are 0 and other bits are 1.

In the above cases (4)-(6), the configuration (e.g., information such as a physical resource, a sequence and the like for transmission) of the predefined beam group or the predefined multiple beam groups may be notified to the terminal device by the network device via high-level signaling, or may be agreed in advance by the network device and the terminal device.

In some embodiments, the terminal device may determine the target beam or the target beam group according to a resource used by the first information as well as a mapping relationship between the resource used by the first information and the target beam or the target beam group.

Or, the terminal device may determine the target sounding signal or the target sounding signal group according to a resource used by the first information as well as a mapping relationship between the resource used by the first information and the target sounding signal or the target sounding signal group.

Specifically, the resource used by the first information has a certain mapping relationship with the above target beam or target beam group (or target sounding signal or target sounding signal group). In this way, the terminal device may determine, upon the reception of the first information, the target beam or target beam group (or target sounding signal or target sounding signal group) corresponding to the resource used by the first information. Herein, the resource used by the first information may be a time frequency physical resource and/or a sequence resource. The mapping relationship may be notified to the terminal device by the network device in advance, or may be agreed in advance by the network device and the terminal device.

For example, the resource used by the first information is a first resource in a first resource set agreed by the network device and the terminal device, and each resource or resource index in the first resource set has a certain mapping relationship with the target sounding signal or sounding signal group. The terminal device may blindly detect the first information in the first resource set, and determines a target sounding signal or target sounding signal group corresponding to a first resource used by the detected first information.

Or, the terminal device may further determine a target beam or target beam group, or determine a target sounding signal or sounding signal group, corresponding to a time domain resource unit index (e.g., a time slot index), a frequency domain resource unit index (e.g., a Physical Resource Block (PRB) index) or a sequence resource index (e.g., a sequence ID) used by the first information.

In some embodiments, the action that the terminal device transmits the uplink signal(s) to the network device by using the target beam or the target beam group may include that, the terminal device performs beamforming on the uplink signal(s) based on a beamforming weight corresponding to the target beam or the target beam group to obtain the beamformed uplink signal(s); and the terminal device transmits the beamformed uplink signal(s) to the network device.

In this embodiment of the disclosure, by employing the target beam or the target beam group, the performance of the network device in terms of receiving the uplink signal(s) can be improved.

In some embodiments, the action that the terminal device transmits the uplink signal(s) to the network device by using the target beam or the target beam group may include that, the terminal device transmits the uplink signal(s) to the network device by using at least one beam in the target beam group.

Alternatively, the terminal device may randomly select at least one beam from the target beam group to transmit the uplink signal(s). Of course, the terminal device may also select the at least one beam from the target beam group in a predetermined manner, e.g., the terminal device selects first K (K is an integer greater than or equal to 1) beams or last K beams from the target beam group to transmit the uplink signal(s).

When the terminal device determines, according to the first information, the target beam group for transmitting the uplink signal(s), the terminal device may employ one or more beams in the target beam group to transmit the uplink signal(s); in other words, the terminal device may adopt all or a part of beams in the target beam group to transmit the uplink signal(s). For example, when there are three uplink signals, and the target beam group includes five beams, the terminal device adopts three beams in the five beams to transmit the three uplink signals; and when there are five uplink signals and the target beam group also includes five beams, the terminal device adopts five beams in the target beam group to transmit the five uplink signals respectively.

In some embodiment, the action that the terminal device transmits the uplink signal(s) to the network device by using the target beam or the target beam group may include that, the terminal device transmits the uplink signal(s) by using the target beam or different beams in the target beam group, where uplink signals transmitted on the different beams are transmitted on different time frequency resources.

Specifically, the uplink signals transmitted on the different beams are transmitted on a same time domain transmission unit and different frequency domain transmission units; or, the uplink signals transmitted on the different beams are transmitted on a same frequency domain transmission unit and different time domain transmission units; or the uplink signals transmitted on the different beams are transmitted on different frequency domain transmission units and different time domain transmission units.

The above time domain transmission unit may be a sub-frame, a time slot, a shortened time slot, and an Orthogonal Frequency Division Multiplexing (OFDM) symbol, etc. The above frequency domain transmission unit may be a PRB, a Physical Resource Group (PRG), a sub-band and a carrier, etc.

For example, when the time domain transmission unit is the time slot and the frequency domain transmission unit is the OFDM symbol, the terminal device may transmit, on different OFDM symbols of the same time slot, different beamformed uplink signals in one beam group. Alternatively, the terminal device may transmit, on different bandwidths of the same time slot, different beamformed uplink signals in one beam group.

It should be understood that the terminal device may transmit the uplink signals on the same time domain resources by using different beams in the target beam group. In addition, when the uplink signals is transmitted on the same time frequency resource, it may be appropriate to adopt a space division multiplexing or code division multiplexing manner.

In some embodiments, when the uplink signal(s) is/are the uplink data, in order to ensure that the network device can receive the uplink data transmitted by the terminal device, when transmission of the uplink data fails, the terminal device needs to perform HARQ retransmission of the uplink data. Regarding transmission of the uplink data to the network device by the terminal device by using the target beam or a part of or all beams in the target beam group, the following several cases may specifically be included.

(7) A first beam in the target beam group is used for first-time transmission of the uplink data, and other beams in the target beam group are used for possible HARQ retransmission of the uplink data.

In other words, the terminal device transmits the uplink data to the network device by using the first beam in the target beam group; and if the transmission of the uplink data fails, the terminal device performs the HARQ retransmission of the uplink data by using beams in the target beam group other than the first beam.

For example, the maximum number of transmission times of the uplink data allowed by the terminal device is 4, the target beam group includes four beams, and a first beam in the target beam group is used for first-time transmission of the uplink data; when the first-time transmission of the uplink data fails, a second beam in the target beam group is used for a first HARQ retransmission of the uplink data; if the first HARQ retransmission fails, a third beam in the target beam group is used for a second HARQ retransmission of the uplink data; and if the second HARQ transmission also fails, a fourth beam in the target beam group is used for a third HARQ retransmission of the uplink data; at this moment, no matter whether the third HARQ retransmission is successful or not, the terminal device no longer performs the HARQ retransmission of the uplink data because the number of transmission times of the uplink data has reached to the maximum number of times allowed by the terminal device.

(8) The first beam in the target beam group is used for the first-time transmission and the possible HARQ retransmission of the uplink data.

The terminal device transmits the uplink data to the network device by using the first beam in the target beam group; and if the transmission of the uplink data fails, the terminal device still performs the HARQ retransmission of the uplink data by using the first beam.

(9) The target beam is at least one beam in the predefined beam group; the target beam is used for the first-time transmission of the uplink data; and beams in the predefined beam group other than the target beam are used for the possible HARQ retransmission of the uplink data.

The terminal device transmits the uplink data by using the target beam; and if the transmission of the uplink data fails, the terminal device still performs the HARQ retransmission of the uplink data by using other beams in the same beam group.

The configuration (e.g., information such as a physical resource, a sequence and the like for transmission) of the predefined beam group may be notified to the terminal device by the network device via high-level signaling, or may be agreed in advance by the network device and the terminal device.

In some embodiments, the action that the terminal device transmits the uplink signal(s) to the network device by using the target beam or the target beam group may include that, the terminal device transmits the uplink signal(s) by using the target beam or different beams in the target beam group, where service types of the uplink signals transmitted on the different beams are different.

The service types of the uplink signals may include: a Long Term Evolution (LTE) system service, an enhanced Mobile Broadband (eMBB) service, an UltraReliable and Low Latency Communication (URLLC) service and a massive Machine Type Communication (mMTC) service.

In some embodiment, the action that the terminal device transmits the uplink signal(s) to the network device by using the target beam or the target beam group may include that, the terminal device transmits the uplink signal(s) by using the target beam or different beams in the target beam group, where sub-carrier spacings used by uplink signals transmitted on the different beams are different.

It should be understood that when the uplink signal(s) include(s) multiple different uplink signals, these uplink signals may be transmitted by using different sub-carrier spacings; and when the same uplink signal is transmitted on different beams, a same sub-carrier spacing may be used.

In some embodiments, the terminal device receives DeModulation Reference Signal (DMRS) configuration information. The DMRS configuration information includes a Cyclic Shift (CS), an Orthogonal Cover Code (OCC) and a sequence Identifier (ID). Since different beams or beam groups may be directed to different receiving points, when the beams or the beam groups for transmitting the uplink signal(s) are different, it is necessary to perform DMRS configuration according to corresponding receiving points, and thus the orthogonality with other uplink signals transmitted simultaneously at the corresponding receiving points is guaranteed.

The method for transmitting the uplink data in the embodiments of the disclosure is described in detail above in combination with FIG. 1 and from the perspective of the terminal device. Hereinafter, the method for transmitting the uplink data in the embodiments of the disclosure will be described below in combination with FIG. 2 and from the perspective of the network device.

It should be understood that the interaction and related characteristics, functions and the like described from the network device between the terminal device and the network device are corresponding to those described from the terminal device side, and the repeated description is omitted appropriately for the briefness.

Figure 2:
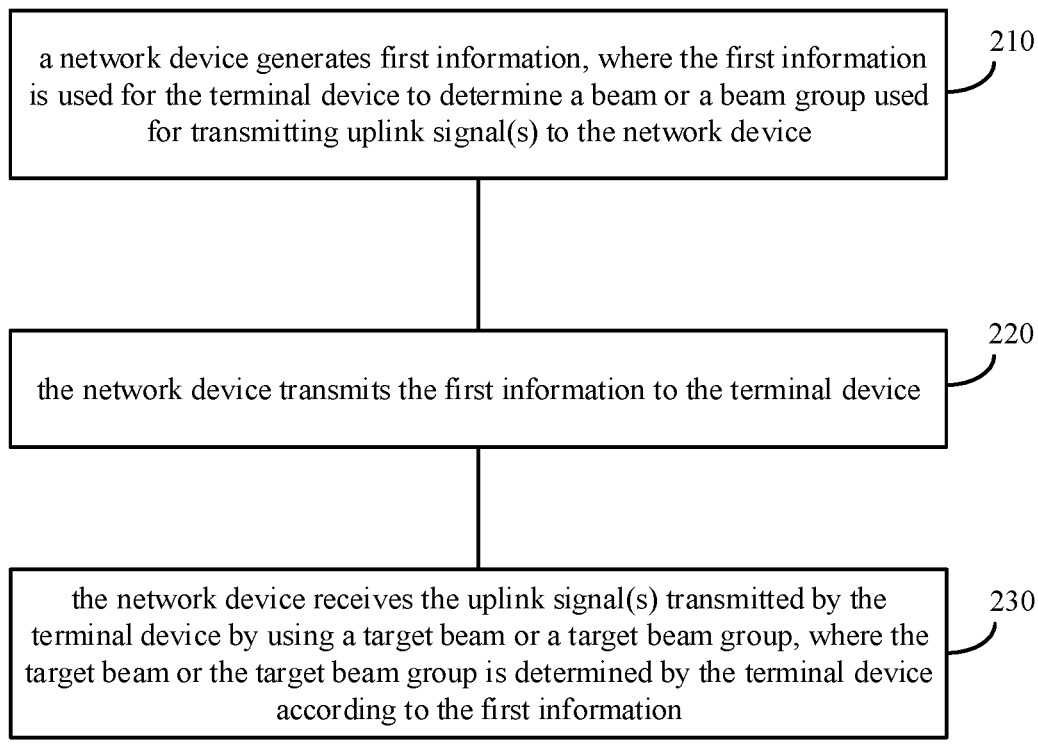
FIG. 2 illustrates a schematic flowchart of a method for uplink signal transmission according to an embodiment of the disclosure.

FIG. 2 illustrates a schematic flowchart of a method for uplink signal transmission according to an embodiment of the disclosure. The method in FIG. 2 may include the following actions.

At 210, a network device generates first information, where the first information is used for the terminal device to determine a beam or a beam group for transmitting one or more uplink signals to the network device.

At 220, the network device transmits the first information to the terminal device.

At 230, the network device receives the uplink signal(s) transmitted by the terminal device by using a target beam or a target beam group, where the target beam or the target beam group is determined by the terminal device according to the first information.

According to the method for transmitting the uplink signal(s) provided by this embodiment of the disclosure, the network device may notify, via the first information, the terminal device of the beam or the beam group for transmitting the uplink signal(s) at present, so that the terminal can transmit the uplink signal(s) to the network side on the target beam or the target beam group determined according to the first information, and thus the performance of the network device in terms of receiving the uplink signal(s) is improved.

Alternatively, as an embodiment, the first information is configured to indicate a target sounding signal in sounding signals transmitted to the network device by the terminal device or a target sounding signal group.

Alternatively, as an embodiment, before the network device transmits the first information to the terminal device, the method may further include that, the network device receives the multiple sounding signals transmitted to the network device by the terminal device by using different beams or beam groups.

Alternatively, as an embodiment, the target sounding signal is at least one sounding signal in a predefined sounding signal group; and the first information is specifically configured to indicate an index of the target sounding signal in the predefined sounding signal group.

Alternatively, as an embodiment, the first information is bitmap information, and the bitmap information is configured to indicate that the target sounding signal is at least one sounding signal in the predefined sounding signal group.

Alternatively, as an embodiment, the first information is specifically configured to indicate an index of the target sounding signal group in predefined multiple sounding signal groups.

Alternatively, as an embodiment, the first information is configured to indicate a beam or a beam group used by the terminal device to transmit the uplink signal(s) to the network device.

Alternatively, as an embodiment, the target beam is at least one beam in a predefined beam group, and the first information is specifically configured to indicate an index of the target beam in the predefined beam group.

Alternatively, as an embodiment, the first information is bitmap information, and the bitmap information is configured to indicate that the target beam is at least one beam in the predefined beam group.

Alternatively, as an embodiment, the first information is specifically configured to indicate an index of the target beam group in predefined multiple beam groups.

Alternatively, as an embodiment, the uplink signal(s) include(s) any one of uplink data, an uplink control signal, an uplink pilot signal and an uplink random access signal.

Alternatively, as an embodiment, the uplink signal(s) include(s) the uplink data; a first beam in the target beam group is used for first-time transmission of the uplink data; and other beams in the target beam group are used for possible HARQ retransmission of the uplink data.

Alternatively, as an embodiment, the uplink signal(s) include(s) the uplink data; and the first beam in the target beam group is used for the first-time transmission and the possible HARQ retransmission of the uplink data.

Alternatively, as an embodiment, the uplink signal(s) include(s) the uplink data; the target beam is at least one beam in the predefined beam group; the target beam is used for the first-time transmission of the uplink data; and beams in the predefined beam group other than the target beam are used for the possible HARQ retransmission of the uplink data.

Alternatively, as an embodiment, the first information is carried in DCI transmitted to the terminal device by the network device.

The method for the uplink signal transmission in the embodiments of the disclosure has been described above in detail in combination with FIG. 1 and FIG. 2. Hereinafter, the terminal device and the network device in the embodiments of the disclosure will be described below in detail in combination with FIG. 3 to FIG. 6. It should be understood that the terminal device and the network device in FIG. 3 to FIG. 6 implement each step executed by the terminal device and the network device in FIG. 1 and FIG. 2, and will not be described in detail to avoid repetition.

FIG. 3 illustrates a schematic structural diagram of a terminal device according to an embodiment of the disclosure. The terminal device in FIG. 3 may include a receiving module 310, a determination module 320 and a transmitting module 330.

The receiving module 310 is configured to receive first information transmitted by a network device, where the first information is used for the terminal device to determine a beam or a beam group for transmitting one or more uplink signals to the network device.

The determination module 320 is configured to determine, according to the first information, a target beam or a target beam group for transmitting the uplink signal(s).

The transmitting module 330 is configured to transmit the uplink signal(s) to the network device by using the target beam or the target beam group.

In this embodiment of the disclosure, the network device may notify, via the first information, the terminal device of the beam or the beam group for transmitting the uplink signal(s) at present, so that the terminal can transmit the uplink signal(s) to the network side on the target beam or the target beam group determined according to the first information, and thus the performance of the network device in terms of receiving the uplink signal(s) is improved.

Alternatively, as an embodiment, the first information is configured to indicate a target sounding signal or a target sounding signal group in multiple sounding signals transmitted to the network device by the terminal device.

Alternatively, as an embodiment, the determination module 320 is specifically configured to: determine a beam or a beam group corresponding to the target sounding signal or the target sounding signal group, to be the target beam or the target beam group for transmitting the uplink signal(s).

Alternatively, as an embodiment, before the receiving module 310 receives the first information transmitted by the network device, the transmitting module 330 is further configured to transmit the multiple sounding signals to the network device by using different beams or beam groups.

Alternatively, as an embodiment, the target sounding signal is at least one sounding signal in a predefined sounding signal group; and the first information is specifically configured to indicate an index of the target sounding signal in the predefined sounding signal group.

Alternatively, as an embodiment, the first information is bitmap information, and the bitmap information is configured to indicate that the target sounding signal is at least one sounding signal in the predefined sounding signal group.

Alternatively, as an embodiment, the first information is specifically configured to indicate an index of the target sounding signal group in predefined multiple sounding signal groups.

Alternatively, as an embodiment, the first information is configured to indicate a beam or a beam group used by the terminal device to transmit the uplink signal(s) to the network device.

Alternatively, as an embodiment, the target beam is at least one beam in a predefined beam group, and the first information is specifically configured to indicate an index of the target beam in the predefined beam group.

Alternatively, as an embodiment, the first information is bitmap information, and the bitmap information is configured to indicate that the target beam is at least one beam in the predefined beam group.

Alternatively, as an embodiment, the first information is specifically configured to indicate an index of the target beam group in predefined multiple beam groups.

Alternatively, as an embodiment, the terminal device may further include a processing module 340.

The processing module 340 is configured to perform beamforming on the uplink signal(s) based on a beamforming weight corresponding to the target beam or the target beam group to obtain the beamformed uplink signal(s).

The transmitting module 330 is specifically configured to transmit the beamformed uplink signal(s) to the network device.

Alternatively, as an embodiment, the transmitting module 330 is specifically configured to transmit the uplink signal(s) to the network device by using at least one beam in the target beam group.

Alternatively, as an embodiment, the transmitting module 330 is specifically configured to transmit the uplink signal(s) by using the target beam or different beams in the target beam group, where the uplink signals transmitted on the different beams are transmitted on different time frequency resources.

Alternatively, as an embodiment, the uplink signals transmitted on the different beams are transmitted on a same time domain transmission unit and different frequency domain transmission units; or the uplink signals transmitted on the different beams are transmitted on a same frequency domain transmission unit and different time domain transmission units.

Alternatively, as an embodiment, the uplink signal(s) include(s) any one of uplink data, an uplink control signal, an uplink pilot signal and an uplink random access signal.

Alternatively, as an embodiment, the uplink signal(s) include(s) the uplink data; a first beam in the target beam group is used for first-time transmission of the uplink data; and other beams in the target beam group are used for possible HARQ retransmission of the uplink data.

Alternatively, as an embodiment, the uplink signal(s) include(s) the uplink data; and the first beam in the target beam group is used for the first-time transmission and the possible HARQ retransmission of the uplink data.

Alternatively, as an embodiment, the uplink signal(s) include(s) the uplink data; the target beam is at least one beam in the predefined beam group; the target beam is used for the first-time transmission of the uplink data; and beams in the predefined beam group other than the target beam are used for the possible HARQ retransmission of the uplink data.

Alternatively, as an embodiment, the transmitting module 330 is specifically configured to transmit the uplink signal(s) by using the target beam or different beams in the target beam group, wherein service types of the uplink signals transmitted on the different beams are different.

Alternatively, as an embodiment, the transmitting module 330 is specifically configured to transmit the uplink signal(s) by using the target beam or different beams in the target beam group, where sub-carrier spacings used by uplink signals transmitted on the different beams are different.

Alternatively, as an embodiment, the first information is carried in DCI transmitted to the terminal device by the network device.

Figure 4:
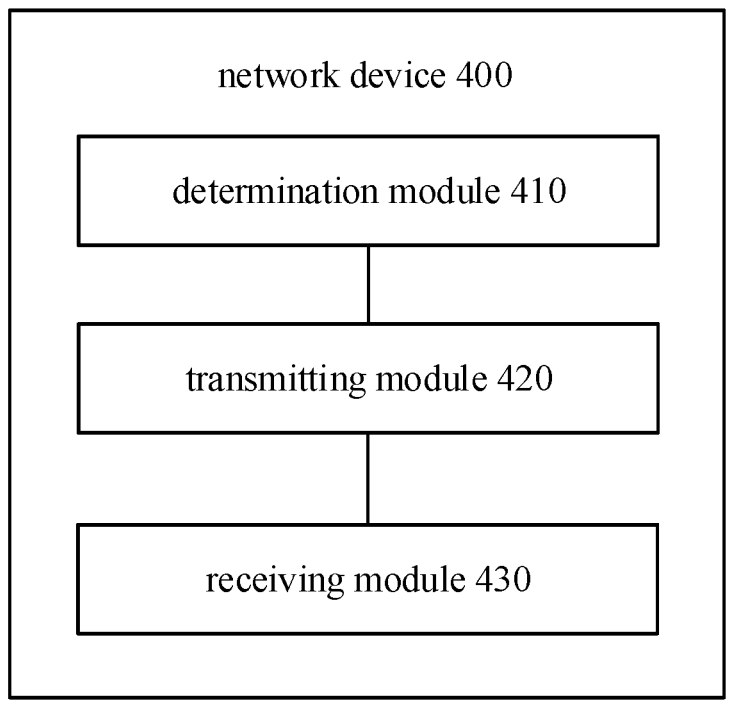
FIG. 4 illustrates a schematic structural diagram of a network device according to an embodiment of the disclosure.

FIG. 4 illustrates a schematic structural diagram of a network device according to an embodiment of the disclosure. The network device 400 in FIG. 4 may include a determination module 410, a transmitting module 420 and a receiving module 430.

The determination module 410 is configured to generate first information, where the first information is used for the terminal device to determine a beam or a beam group used for transmitting one or more uplink signals to the network device.

The transmitting module 420 is configured to transmit the first information to the terminal device.

The receiving module 430 is configured to receive the uplink signal(s) transmitted by the terminal device by using a target beam or a target beam group, where the target beam or the target beam group is determined by the terminal device according to the first information.

In this embodiment of the disclosure, the network device may notify, via the first information, the terminal device of the beam or the beam group for transmitting the uplink signal(s) at present, so that the terminal can transmit the uplink signal(s) to the network side on the target beam or the target beam group determined according to the first information, and thus the performance of the network device in terms of receiving the uplink signal(s) is improved.

Alternatively, as an embodiment, the first information is configured to indicate a target sounding signal or a target sounding signal group in multiple sounding signals transmitted to the network device by the terminal device.

Alternatively, as an embodiment, before the transmitting module 420 transmits the first information to the terminal device, the receiving module 430 is further configured to receive the multiple sounding signals transmitted to the network device by the terminal device by using different beams or beam groups.

Alternatively, as an embodiment, the target sounding signal is at least one sounding signal in a predefined sounding signal group; and the first information is specifically configured to indicate an index of the target sounding signal in the predefined sounding signal group.

Alternatively, as an embodiment, the first information is bitmap information, and the bitmap information is configured to indicate that the target sounding signal is at least one sounding signal in the predefined sounding signal group.

Alternatively, as an embodiment, the first information is specifically configured to indicate an index of the target sounding signal group in predefined multiple sounding signal groups.

Alternatively, as an embodiment, the first information is configured to indicate a beam or a beam group used by the terminal device to transmit the uplink signal(s) to the network device.

Alternatively, as an embodiment, the target beam is at least one beam in a predefined beam group, and the first information is specifically configured to indicate an index of the target beam in the predefined beam group.

Alternatively, as an embodiment, the first information is bitmap information, and the bitmap information is configured to indicate that the target beam is at least one beam in the predefined beam group.

Alternatively, as an embodiment, the first information is specifically configured to indicate an index of the target beam group in predefined multiple beam groups.

Alternatively, as an embodiment, the uplink signal(s) include(s) any one of uplink data, an uplink control signal, an uplink pilot signal and an uplink random access signal.

Alternatively, as an embodiment, the uplink signal(s) include(s) the uplink data; a first beam in the target beam group is used for first-time transmission of the uplink data;

and other beams in the target beam group are used for possible HARQ retransmission of the uplink data.

Alternatively, as an embodiment, the uplink signal(s) include(s) the uplink data; and the first beam in the target beam group is used for the first-time transmission and the possible HARQ retransmission of the uplink data.

Alternatively, as an embodiment, the uplink signal(s) include(s) the uplink data; the target beam is at least one beam in the predefined beam group; the target beam is used for the first-time transmission of the uplink data; and beams in the predefined beam group other than the target beam are used for the possible HARQ retransmission of the uplink data.

Alternatively, as an embodiment, the first information is carried in DCI transmitted to the terminal device by the network device.

Figure 5:
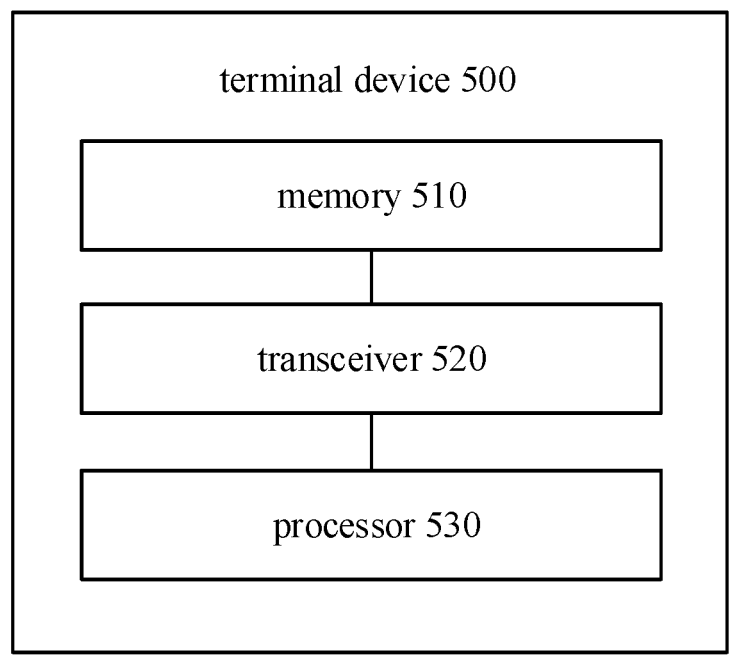
FIG. 5 illustrates a schematic structural diagram of a terminal device according to an embodiment of the disclosure.

FIG. 5 illustrates a schematic structural diagram of a terminal device according to an embodiment of the disclosure. The terminal device in FIG. 5 may include a memory 510, a transceiver 520 and a processor 530.

The memory 510 is configured to store a program.

The transceiver 520 is configured to receive first information transmitted by a network device, where the first information is used for the terminal device to determine a beam or a beam group for transmitting one or more uplink signals to the network device.

The processor 530 is configured to execute the program; and when the program is executed, the processor 620 is specifically configured to determine a target beam or a target beam group for transmitting the uplink signal(s) according to the first information.

The transceiver 520 is further configured to transmit the uplink signal(s) to the network device by using the target beam or the target beam group.

In this embodiment of the disclosure, the network device may notify, via the first information, the terminal device of the beam or the beam group for transmitting the uplink signal(s) at present, so that the terminal can transmit the uplink signal(s) to the network side on the target beam or the target beam group determined according to the first information, and thus the performance of the network device in terms of receiving the uplink signal(s) is improved.

Alternatively, as an embodiment, the first information is configured to indicate a target sounding signal or a target sounding signal group in multiple sounding signals transmitted to the network device by the terminal device.

Alternatively, as an embodiment, the processor 530 is specifically configured to: determine a beam or a beam group corresponding to the target sounding signal or the target sounding signal group, to be the target beam or the target beam group for transmitting the uplink signal(s).

Alternatively, as an embodiment, before the transceiver 520 receives the first information transmitted by the network device, the transceiver 520 is further configured to transmit the multiple sounding signals to the network device by using different beams or beam groups.

Alternatively, as an embodiment, the target sounding signal is at least one sounding signal in a predefined sounding signal group; and the first information is specifically configured to indicate an index of the target sounding signal in the predefined sounding signal group.

Alternatively, as an embodiment, the first information is bitmap information, and the bitmap information is configured to indicate that the target sounding signal is at least one sounding signal in the predefined sounding signal group.

Alternatively, as an embodiment, the first information is specifically configured to indicate an index of the target sounding signal group in predefined multiple sounding signal groups.

Alternatively, as an embodiment, the first information is configured to indicate a beam or a beam group used by the terminal device to transmit the uplink signal(s) to the network device.

Alternatively, as an embodiment, the target beam is at least one beam in a predefined beam group, and the first information is specifically configured to indicate an index of the target beam in the predefined beam group.

Alternatively, as an embodiment, the first information is bitmap information, and the bitmap information is configured to indicate that the target beam is at least one beam in the predefined beam group.

Alternatively, as an embodiment, the first information is specifically configured to indicate an index of the target beam group in predefined multiple beam groups.

Alternatively, as an embodiment, the transceiver 520 is specifically configured to: perform beamforming on the uplink signal(s) based on a beamforming weight corresponding to the target beam or the target beam group to obtain the beamformed uplink signal(s); and transmit the beamformed uplink signal(s) to the network device.

Alternatively, as an embodiment, the transceiver 520 is specifically configured to: transmit the uplink signal(s) to the network device by using at least one beam in the target beam group.

Alternatively, as an embodiment, the transceiver 520 is specifically configured to: transmit the uplink signal(s) by using the target beam or different beams in the target beam group, where uplink signals transmitted on the different beams are transmitted on different time frequency resources.

Alternatively, as an embodiment, the uplink signals transmitted on the different beams are transmitted on a same time domain transmission unit and different frequency domain transmission units; or the uplink signals transmitted on the different beams are transmitted on a same frequency domain transmission unit and different time domain transmission units.

Alternatively, as an embodiment, the uplink signal(s) include(s) any one of uplink data, an uplink control signal, an uplink pilot signal and an uplink random access signal.

Alternatively, as an embodiment, the uplink signal(s) include(s) the uplink data; a first beam in the target beam group is used for first-time transmission of the uplink data; and other beams in the target beam group are used for possible HARQ retransmission of the uplink data.

Alternatively, as an embodiment, the uplink signal(s) include(s) the uplink data; and the first beam in the target beam group is used for the first-time transmission and the possible HARQ retransmission of the uplink data.

Alternatively, as an embodiment, the uplink signal(s) include(s) the uplink data; the target beam is at least one beam in the predefined beam group; the target beam is used for the first-time transmission of the uplink data; and beams in the predefined beam group other than the target beam are used for the possible HARQ retransmission of the uplink data.

Alternatively, as an embodiment, the transceiver 520 is specifically configured to: transmit the uplink signal(s) by using the target beam or different beams in the target beam group, wherein service types of the uplink signals transmitted on the different beams are different.

Alternatively, as an embodiment, the transceiver 520 is specifically configured to: transmit the uplink signal(s) by using the target beam or different beams in the target beam group, where sub-carrier spacings used by the uplink signals transmitted on the different beams are different.

Alternatively, as an embodiment, the first information is carried in DCI transmitted to the terminal device by the network device.

Figure 6:
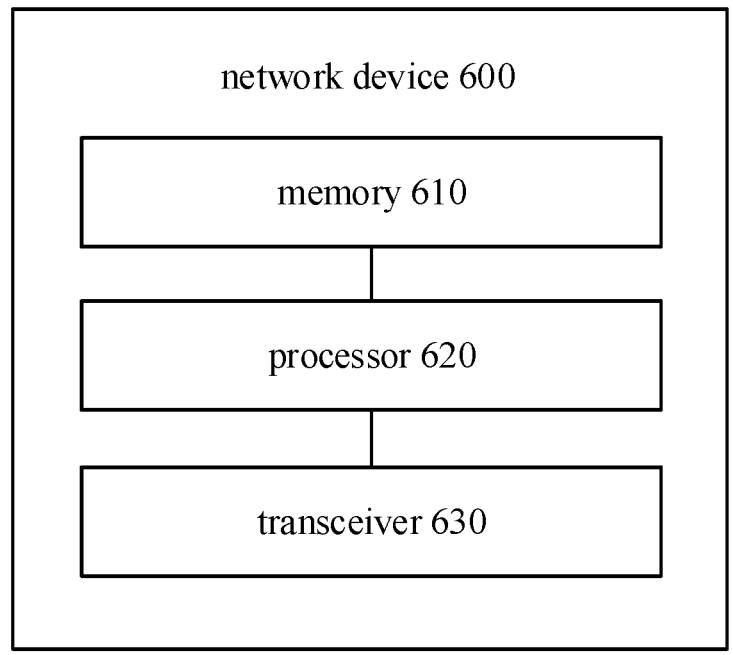
FIG. 6 illustrates a schematic structural diagram of a network device according to an embodiment of the disclosure.

FIG. 6 illustrates a schematic structural diagram of a network device according to an embodiment of the disclosure. The network device 600 in FIG. 6 may include a memory 610, a processor 620 and a transceiver 630.

The processor 610 is configured to store a program.

The processor 620 is configured to execute the program; and when the program is executed, the processor 620 is specifically configured to generate first information, where the first information is used for a terminal device to determine a beam or a beam group used for transmitting one or more uplink signals to a network device.

The transceiver 630 is configured to transmit the first information to the terminal device.

The transceiver 630 is further configured to receive the uplink signal(s) transmitted by the terminal device by using the target beam or the target beam group, where the target beam or the target beam group is determined by the terminal device according to the first information.

In this embodiment of the disclosure, the network device may notify, via the first information, the terminal device of the beam or the beam group for transmitting the uplink signal(s) at present, so that the terminal can transmit the uplink signal(s) to the network side on the target beam or the target beam group determined according to the first information, and thus the performance of the network device in terms of receiving the uplink signal(s) is improved.

Alternatively, as an embodiment, the first information is configured to indicate a target sounding signal or a target sounding signal group in multiple sounding signals transmitted to the network device by the terminal device.

Alternatively, as an embodiment, before the transceiver 630 transmits the first information to the terminal device, the transceiver 630 is further configured to receive the multiple sounding signals transmitted to the network device by the terminal device by using different beams or beam groups.

Alternatively, as an embodiment, the target sounding signal is at least one sounding signal in a predefined sounding signal group; and the first information is specifically configured to indicate an index of the target sounding signal in the predefined sounding signal group.

Alternatively, as an embodiment, the first information is bitmap information, and the bitmap information is configured to indicate that the target sounding signal is at least one sounding signal in the predefined sounding signal group.

Alternatively, as an embodiment, the first information is specifically configured to indicate an index of the target sounding signal group in predefined multiple sounding signal groups.

Alternatively, as an embodiment, the first information is configured to indicate a beam or a beam group used by the terminal device to transmit the uplink signal(s) to the network device.

Alternatively, as an embodiment, the target beam is at least one beam in a predefined beam group, and the first information is specifically configured to indicate an index of the target beam in the predefined beam group.

Alternatively, as an embodiment, the first information is bitmap information, and the bitmap information is configured to indicate that the target beam is at least one beam in the predefined beam group.

Alternatively, as an embodiment, the first information is specifically configured to indicate an index of the target beam group in predefined multiple beam groups.

Alternatively, as an embodiment, the uplink signal(s) include(s) any one of uplink data, an uplink control signal, an uplink pilot signal, and an uplink random access signal.

Alternatively, as an embodiment, the uplink signal(s) include(s) the uplink data; a first beam in the target beam group is used for first-time transmission of the uplink data; and other beams in the target beam group are used for possible HARQ retransmission of the uplink data.

Alternatively, as an embodiment, the uplink signal(s) include(s) the uplink data; and the first beam in the target beam group is used for the first-time transmission and the possible HARQ retransmission of the uplink data.

Alternatively, as an embodiment, the uplink signal(s) include(s) the uplink data; the target beam is at least one beam in the predefined beam group; the target beam is used for the first-time transmission of the uplink data; and beams in the predefined beam group other than the target beam are used for the possible HARQ retransmission of the uplink data.

Alternatively, as an embodiment, the first information is carried in DCI transmitted to the terminal device by the network device.

Figure 7:
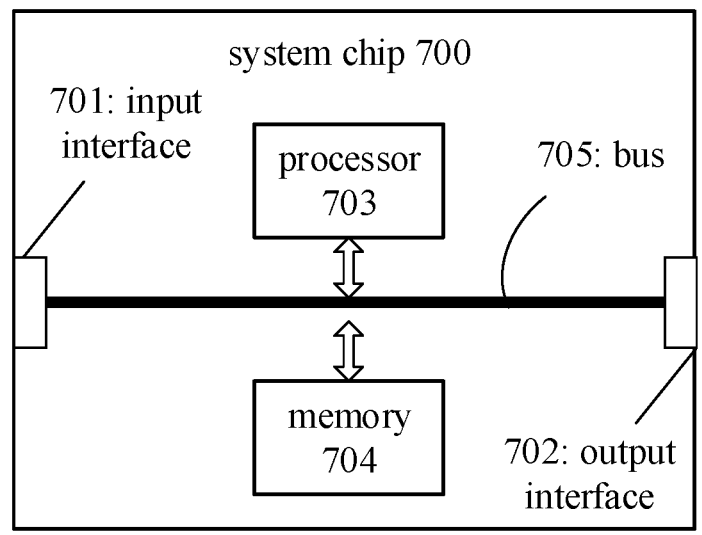
FIG. 7 illustrates a schematic structural diagram of a system chip according to an embodiment of the disclosure.

FIG. 7 illustrates a schematic structural diagram of a system chip according to an embodiment of the disclosure. The system chip 700 in FIG. 7 may include an input interface 701, an output interface 702, a processor 703 and a memory 704, which are connected via a bus 705. The processor 703 is configured to execute codes in the memory 704; and when the codes are executed, the processor 703 implements the method executed by the terminal device illustrated in FIG. 1.

Figure 8:
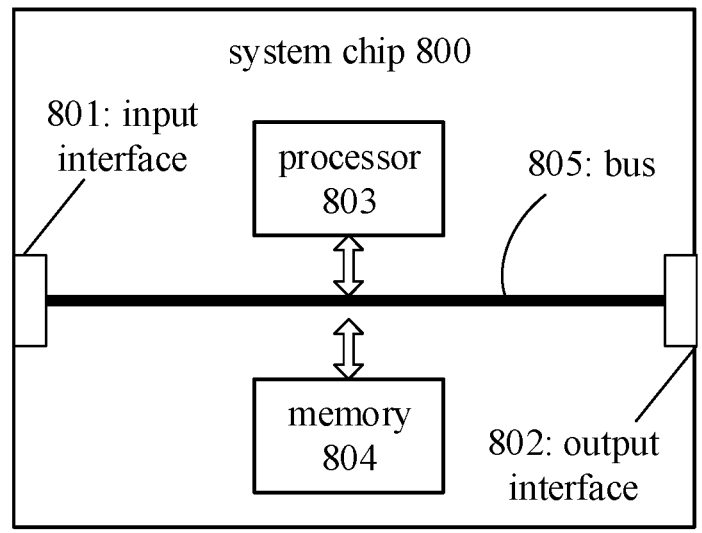
FIG. 8 illustrates a schematic structural diagram of a system chip according to an embodiment of the disclosure.

FIG. 8 illustrates a schematic structural diagram of a system chip according to an embodiment of the disclosure. The system chip 800 in FIG. 8 may include an input interface 801, an output interface 802, a processor 803 and a memory 804, which are connected via a bus 805. The processor 803 is configured to execute codes in the memory 804; and when the codes are executed, the processor 803 implements the method executed by the terminal device illustrated in FIG. 2.

It should be understood that the method for uplink signal transmission in the embodiments of the disclosure may be applied to various communications systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Universal Mobile Telecommunication System (UMTS) system and other existing communication systems, and particularly may be applied to, a future $5^{th}$ Generation (5G) system.

The network device in the embodiments of the disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scene; or the network device may be a relay station, an access point, a vehicle-amounted device, a wearable device as well as a network device in the future 5G system or a network device in the future evolved Public Land Mobile Network (PLMN) network, all of which are not defined in the embodiments of the disclosure.

The terminal device in the embodiments of the disclosure may be User Equipment (UE), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, a terminal device in a future 5G network or a terminal device in a PLMN, all of which are not defined in the embodiments of the disclosure.

It may be appreciated by a person of ordinary skill in the art that units and actions of algorithms in each example described in combination with embodiments disclosed in the disclosure may be implemented by electronic hardware or a combination of computer software and electronic hardware. Whether these functions are executed via a hardware manner or a software manner is determined by a specific application and a designed constraint condition of the technical solutions. A person skilled in the art may be implemented the described function by using different methods for each specific application. However, such implementation should not be considered as being beyond the scope of the disclosure.

The person skilled in the art may clearly understand that, for the convenience and briefness of description, the above-described specific working process of the system, the apparatus and the unit may be referred to the corresponding process of the foregoing method embodiment and will not be repeated here.

In some embodiments provided by the application, it should be understood that the disclosed system, apparatus and method may be implemented in other manners. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit. The integrated unit may be implemented in a hardware form, and may also be implemented in form of hardware and software function unit.

When being implemented in form of a software function unit and sold or used as an independent product, the functions may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The above-mentioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for uplink signal transmission, comprising:
transmitting, by a terminal device, multiple sounding signals to a network device;
receiving, by the terminal device, first information transmitted by a network device, wherein the first information is configured to indicate a target sounding signal group in the multiple sounding signals transmitted to the network device,
wherein the target sounding signal group comprises multiple target sounding signals;
determining, by the terminal device according to the first information, a beam group corresponding to the target sounding signal group for transmitting uplink data;
wherein the first information is configured to indicate the target sounding signal group by indicating indices of the multiple target sounding signals; and
transmitting, by the terminal device, the uplink data to the network device by the determined beam group;
wherein a first beam in the determined beam group is used for first-time transmission of the uplink data, and at least one beam other than the first beam in the determined beam group is used for possible retransmission of the uplink data.

2. A terminal device, comprising:
a memory storing a program;
a processor, configured to execute the program; and
a transceiver, configured to transmit multiple sounding signals to a network device; and receive first information transmitted by the network device,
wherein the first information is configured to indicate a target sounding signal group in the multiple sounding signals transmitted to the network device, the target sounding signal group comprising multiple target sounding signals;
wherein the processor is configured to execute the program to determine a beam group that corresponding to the target sounding signal group for transmitting uplink data according to the first information; wherein the first information is configured to indicate the target sounding signal group by indicating indices of multiple target sounding signals; and
wherein the transceiver is further configured to transmit the uplink data to the network device by using the determined beam group; wherein a first beam in the determined beam group is used for first-time transmission of the uplink data, and at least one beam other than the first beam in the determined beam group is used for possible retransmission of the uplink data.

3. The terminal device of claim 2, wherein the processor is configured to execute the program to perform beamforming on the uplink data based on a beamforming weight corresponding to the determined beam group to obtain the beamformed uplink data; and the transceiver is configured to transmit the beamformed uplink data to the network device.

4. The terminal device of claim 2, wherein the transceiver is configured to:

transmit the uplink data by using multiple beams in the determined beam group, wherein service types of the uplink data transmitted on the multiple beams are different.

5. The terminal device of claim 2, wherein the transceiver is configured to:

transmit the uplink data by using multiple beams in the determined beam group, wherein the uplink data transmitted on the multiple beams are transmitted on different time frequency resources.

6. The terminal device of claim 5, wherein the uplink data transmitted on the multiple beams are transmitted on a same time domain transmission unit and different frequency domain transmission units; or, the uplink data transmitted on the multiple beams are transmitted on a same frequency domain transmission unit and different time domain transmission units.

* * * * *